United States Patent [19]

Sakane et al.

[11] Patent Number: 5,152,551
[45] Date of Patent: Oct. 6, 1992

[54] STEERING WHEEL HAVING IMPACT ABSORBING MEMBER

[75] Inventors: Katsunobu Sakane; Yoshiyuki Fujita, both of Inazawa, Japan

[73] Assignee: Toyoda Gosei Co., Ltd., Nishikasugai, Japan

[21] Appl. No.: 722,152

[22] Filed: Jun. 27, 1991

[30] Foreign Application Priority Data

| Jun. 28, 1990 | [JP] | Japan | 2-171250 |
| Jun. 29, 1990 | [JP] | Japan | 2-172888 |
| Jul. 4, 1990 | [JP] | Japan | 2-176581 |
| Jul. 25, 1990 | [JP] | Japan | 2-079145[U] |

[51] Int. Cl.⁵ ............................................. B60R 21/05
[52] U.S. Cl. ..................................... 280/777; 280/750
[58] Field of Search ............... 280/777, 750; 74/552, 74/558

[56] References Cited

U.S. PATENT DOCUMENTS

| 3,167,974 | 2/1965 | Wilfert | 280/777 |
| 3,540,304 | 11/1970 | Weiss | 280/777 |
| 4,390,193 | 6/1983 | Strahan et al. | 280/750 X |
| 4,485,371 | 11/1984 | Yamada et al. | 74/552 |
| 4,790,209 | 12/1988 | Ishida | 280/750 X |
| 4,939,951 | 7/1990 | Kaneko | 280/750 X |

FOREIGN PATENT DOCUMENTS

| 0026673 | 2/1983 | Japan | 74/552 |
| 58-143766 | 9/1983 | Japan | . |
| 0015238 | 1/1985 | Japan | 280/777 |
| 0026160 | 2/1987 | Japan | 74/552 |
| 62-194177 | 10/1987 | Japan | . |
| 63-172774 | 11/1988 | Japan | . |

Primary Examiner—Charles A. Marmor
Assistant Examiner—Tamara L. Graysay
Attorney, Agent, or Firm—Cushman, Darby & Cushman

[57] ABSTRACT

A steering wheel disposed in such a manner that an impact energy absorbing member made of sheet metal and having an upper wall portion and side walls extending downward from the two longitudinal end portions of the upper wall is fastened to the upper surface fo a boss portion and a pad is fitted to cover the impact energy absorbing member. The pad is provided with projecting portions made of a rigid synthetic resin, which are brought into contact with the portion adjacent to the two longitudinal ends of the upper wall of the energy absorbing member, formed on the reverse side of the upper wall of the pad. When impact force acts, from a substantially upper portion, on the central portion of the upper wall of the pad, the projecting portions assuredly crush the side walls of the energy absorbing member. As a result, impact energy can be assuredly absorbed.

17 Claims, 14 Drawing Sheets

STEERING WHEEL HAVING IMPACT ABSORBING MEMBER

BACKGROUND OF THE INVENTION

1. Field of the Invention

The present invention relates to a steering wheel to be mounted on a vehicle, and, more particularly, to a steering wheel having an impact energy absorbing member included in a pad which is fastened to the upper surface of the boss portion of the steering wheel.

2. Description of the Prior Art

Hitherto, there has been disclosed a steering wheel arranged in such a manner that an impact energy absorbing member made of sheet metal is disposed in a box-like pad which is fastened to the upper surface of the boss portion of the steering wheel whereby impact energy acting on the pad can be absorbed (see Japanese Utility Model Unexamined Publication No. 58-143766).

Since the above-disclosed steering wheel is arranged in such a manner that the pad is mainly made of a soft synthetic resin, a pipe-like insert made of a semi-rigid synthetic resin is embedded in the pad for the purpose of retaining the outer shape of the pad. Furthermore, the energy absorbing member made of sheet metal and having an n-shape cross section is disposed in the above-described pad. The pad with the energy absorbing member thus-disposed is fastened to the upper surface of the boss portion of the steering wheel body.

In a state where the above-described steering wheel is fastened to the steering shaft, the upper wall of the pad is downward inclined in the forward direction of the vehicle so that the meter visibility is improved. Also the upper wall of the energy absorbing member is downward inclined in the same direction in such a manner that it runs substantially parallel to the upper wall of the pad.

However, if the upper wall portion of the pad of the conventional steering wheel thus-constituted is inclined in order to further improve the above-described meter visibility, the upper wall of the energy absorbing member necessarily is inclined considerably. Therefore, problem arises in that, when an impact force from an upper portion acts in a downward direction on the central portion of the upper wall portion of the pad, the component of the force pressing the energy absorbing member rearward is enlarged excessively and thereby the side wall portion of the energy absorbing member cannot be deformed so as to be sufficiently crushed.

Furthermore, it might be considered feasible to employ a structure arranged in such a manner that the costly soft synthetic resin such as the urethane resin employed to manufacture the pad is replaced by a relatively cheap rigid synthetic resin such as polypropylene to reduce cost. In this case, the major portion of the pad, which defines the shape of the pad, is made of the thus-employed rigid synthetic resin and the surface of the pad is covered with a cover layer made of the soft synthetic resin so that the overall cost required to manufacture the pad can be reduced. However, if the pad of the conventional steering wheel is made of the rigid synthetic resin, there arises a problem in that the side wall portion of the box-like pad cannot be easily deformed due to the rigidity of the employed rigid synthetic resin and thereby there is a fear that the side wall portion of the energy absorbing member cannot sufficiently be deformed.

A structure has been disclosed in Japanese Utility Model Unexamined Publication No. 62-194177 which is arranged in such a manner that a pad having a reverse side, to which a metal member for fastening the impact energy absorbing member or the like is secured, is fastened to the steering wheel body.

According to the above-disclosed structure for fastening the pad to the steering wheel body, the impact energy absorbing member comprises a deformable portion which absorbs impact energy when it is deformed and which has an inverted U-shaped cross section and a substantially rectangular frame-like base portion to be secured to the above-described deformable portion, both the deformable portion and the base portion being made of sheet metal. Furthermore, a plurality of fitting legs made of rigid synthetic resin are screwed to the base portion. On the other hand, the steering wheel body has, in a boss plate thereof, a plurality of fitting holes which correspond to the above-described fitting legs, the boss plate constituting the metal core of the steering wheel.

By inserting each of the fitting legs into the fitting hole until the fitting legs are engaged to the peripheral portions of the fitting holes, the pad can be fastened to the steering wheel body.

However, since the above-described conventional structure for fastening the pad to the steering wheel body is arranged in such a manner that the fitting legs are screwed to the base portion of the impact energy absorbing member, the number of parts cannot be reduced, causing the number of manufacturing processes to be increased when the steering wheel arranged in such a manner that the pad having the impact energy absorbing member is fastened to the steering wheel body is manufactured.

In addition, a structure, in which a horn pad is fastened to a fixed contact plate, has been disclosed in Japanese Utility Model Unexamined Publication No. 63-172774.

According to the above-disclosed structure, a horn switch mechanism composed of a movable contact plate made of a leaf spring and a fixed contact plate made of sheet metal is disposed on the reverse side of the horn pad. The horn pad is fastened to the fixed contact plate in such a manner that the horn pad is able to move to approach the above-described fixed contact plate by the above-described movable contact plate made of the leaf spring and thereby serving as an urging member. Furthermore, the horn pad is fastened to the fixed contact plate in such a manner that it is urged so as to be positioned away from the fixed contact plate by a predetermined distance.

Specifically, the horn pad is fastened to the fixed contact plate in such a manner that substantially-cylindrical spacers, each of which has a flange portion at an end portion thereof and which are made of synthetic resin, are respectively inserted into a plurality of fastening holes formed in the fixed contact plate in such a manner that the other end portion of each of the spacers faces the horn pad. Then, each of the flange portions is brought into contact with the peripheral portion of each of the fastening holes before each of the spacers is screwed to the reverse side of the horn pad. As a result, the fixed contact plate is fastened to the reverse side of the horn pad.

The movable contact plate is disposed between the fixed contact plate and the horn pad in such a manner that its contact portion is disposed on the reverse side of the horn pad so as to urge the horn pad to move away from the fixed contact plate. The distance of the movement away from the fixed contact plate is restricted by the fact that the flange portion of the spacer screwed to the horn pad comes in contact with the peripheral portion of the fastening hole formed in the fixed contact plate.

When the horn switch is operated, the horn pad is depressed so that its contact portion is moved downward to come in contact with the fixed contact plate because the horn pad is, on the reverse side thereof, supported by the contact portion of the movable contact plate. As a result, the horn is operated. At this time, the horn pad approaches the fixed contact plate by the action of the spacer which slides on the inner surface of the fastening hole formed in the fixed contact plate and which serves as a guide member for guiding the horn pad.

The above-described spacer is provided for the main purpose of preventing undesirable contact which will take place between the fixed contact plate and the above-described fastening screw.

However, the conventional structure for fastening the horn pad to the fixed contact plate must use a plurality of fastening screws and the spacers of the same number must be placed at the fastening portions.

As described above, since a large number of screws and spacers must be used in the conventional fastening structure, the number of parts for use at the time of the fastening process cannot be reduced, causing a considerable number of fastening processes. As a result, the fastening cost cannot be reduced.

SUMMARY OF THE INVENTION

It is a principle object of the present invention to provide a steering wheel in which the downward inclination of the upper wall of its pad in the forward direction can be enlarged, in which a rigid synthetic resin, the cost of which can be reduced, can be used so that the pad manufacturing cost can be reduced and in which the side wall portion of an impact energy absorbing member can be deformed and thereby be crushed effectively.

Another object of the present invention is to provide a structure for fastening a pad of a steering wheel with which the number of parts required to fasten a pad having an impact energy absorbing member to a steering wheel body can be reduced and thereby the number of fastening processes can be reduced.

Another object of the present invention is to provide a structure for fastening the pad with which the number of parts required to fasten the pad to an impact energy absorbing member can be reduced and thereby the number of fastening processes and the fastening cost can be reduced.

In order to achieve the above-described objects, according to the present invention, there is provided a steering wheel comprising a boss portion to which a steering shaft is fastened, a wheel portion disposed around the boss portion, spokes for connecting the boss portion and the wheel portion, an energy absorbing member disposed on the boss portion and made of sheet metal, the energy absorbing member having a pair of side walls disposed to confront each other while being deviated from each other in the axial direction of the steering shaft, and an upper wall having two end portions extending in a direction perpendicular to the axis of the steering shaft and connected to upper end portions of the pair of side walls and an inclined portion for connecting the two end portions, and a pad for covering the energy absorbing member, the pad having a shell disposed at an interval from the energy absorbing member, and a projecting portion extending from the shell toward at least one of the end portions of the energy absorbing member.

The steering wheel according to the present invention thus constituted is arranged in such a manner that, when impact force acts from a substantially upper portion on the central portion of the upper wall portion of the pad, the projecting portion formed on the reverse side of the upper wall of the pad is brought into contact with a portion of the upper wall portion of the impact energy absorbing member adjacent to the upper end portion of the side wall so that the side wall portion of the energy absorbing member is deformed so as to be assuredly crushed. Therefore, the impact energy absorbing effect can be assuredly obtained.

According to an embodiment of the present invention, the impact energy absorbing member has a base portion for connecting the lower end portions of the side walls, a plurality of fitting holes are formed in the above-described base portion and the fitting projections formed in the boss portion are fitted to the above-described fitting holes, whereby the pad can be fastened to the steering wheel body. Alternatively, the pad and the steering wheel body may be coupled to each other in such a manner that a plurality of fitting holes are formed in the boss portion and the fitting projections to be fastened to these fitting holes are formed in the base portion. According to the above-described structure of fastening the pad, the screw fixing work can be completely omitted. Therefore, the number of parts can be reduced and the fastening processes can also be reduced when the pad having the impact energy absorbing member is fastened to the steering wheel body.

According to another embodiment of the present invention, a steering wheel comprises a fitting leg projecting from the reverse side of the pad and having a shaft portion which has a flange portion at the distal end thereof, a fastening hole formed in either one of the end portions of the upper wall of the energy absorbing member, a fitting hole formed at another end portion of the upper wall of the energy absorbing member to correspond to the fitting leg, the fitting hole having an insertion portion opened to allow the flange portion of the fitting leg to be inserted and a fitting opening portion which is contiguous to the insertion portion, which has a diameter smaller than that of the flange portion and into which the shaft portion can be inserted, whereby in a state where the flange portion of the fitting leg is fitted to the peripheral portion of the fitting opening portion by sliding the fitting leg into the fitting opening portion after the fitting leg has been inserted into the insertion portion, a substantially cylindrical spacer which has a flange portion at an end portion thereof is inserted into the fastening hole so as to bring the flange portion of the spacer into contact with the peripheral portion of the fastening hole before the spacer is screw-fixed to the reverse side of the pad so that the pad is fastened to the energy absorbing member.

According to the fastening structure according to this embodiment, the fitting leg of a predetermined shape and projecting from the reverse side of the pad is fitted to the peripheral portion of the fitting hole of a predetermined shape and formed in the upper wall of the energy absorbing member. Therefore, the pad can be fastened to the energy absorbing member while reducing the number of the spacers and fastening screws. As a result, the number of parts required at the time of the fastening operation can be reduced and thereby both the number of the fastening processes and the fastening cost can be reduced.

Other objects, features and advantages of the present invention will become apparent from the following description made with reference to the drawings.

DESCRIPTION OF THE PREFERRED EMBODIMENTS

A first embodiment of the present invention will now be described with reference to FIGS. 1 to 12.

Figure 2:
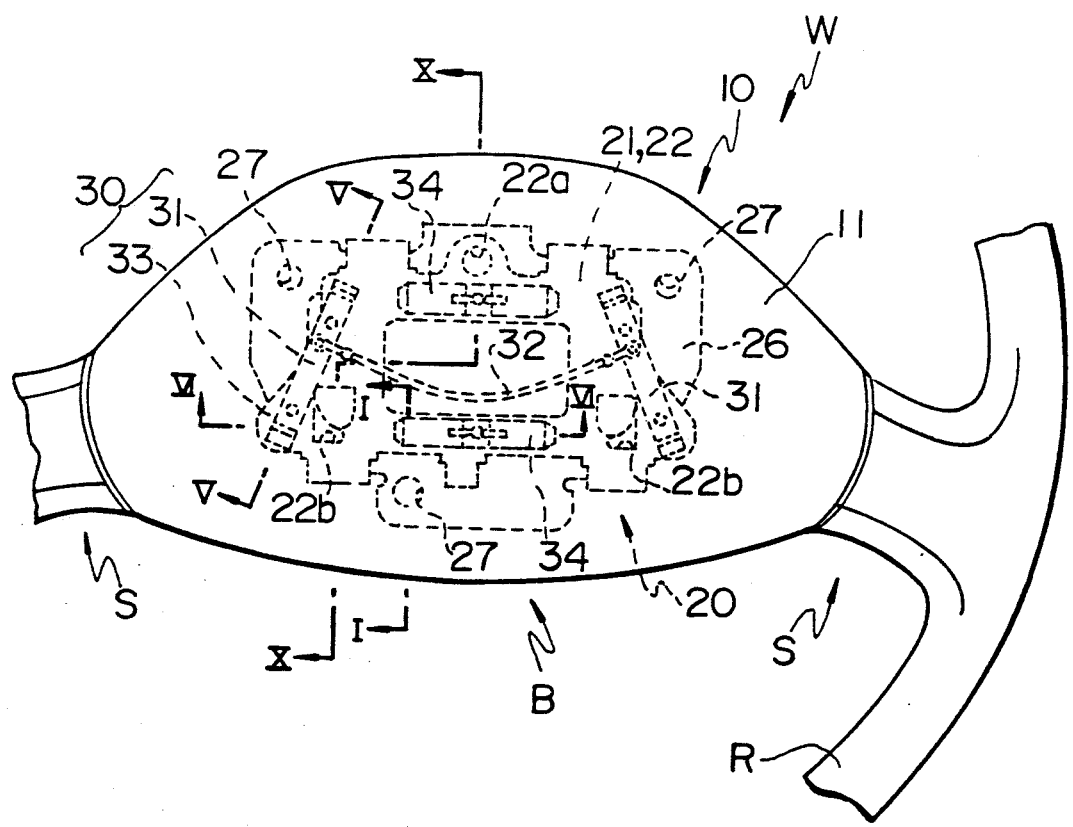
FIG. 2 is a plan view which illustrates a steering wheel according to the first embodiment of the present invention.

As shown in FIG. 2, a steering wheel W according to this embodiment comprises a boss portion B, two spoke portions S extending from the boss portion B and an annular ring portion R connected to the spoke portions S. Furthermore, a horn pad 10 is disposed on the boss portion B.

According to this embodiment, a steering wheel body 1, to which the horn pad 10 is fastened, includes the portions of the steering wheel W except for the horn pad 10. That is, the steering wheel body 1 comprises a boss 2, a boss plate 3, a spoke core 4, a ring core 5, a cover layer 6 covering a portion of the spoke core 4 and the ring core 5 and a lower cover 7 made of rigid synthetic resin fastened to the spoke core 4 with a screw 29 (see FIGS. 1, 4 and 9).

Figure 5:
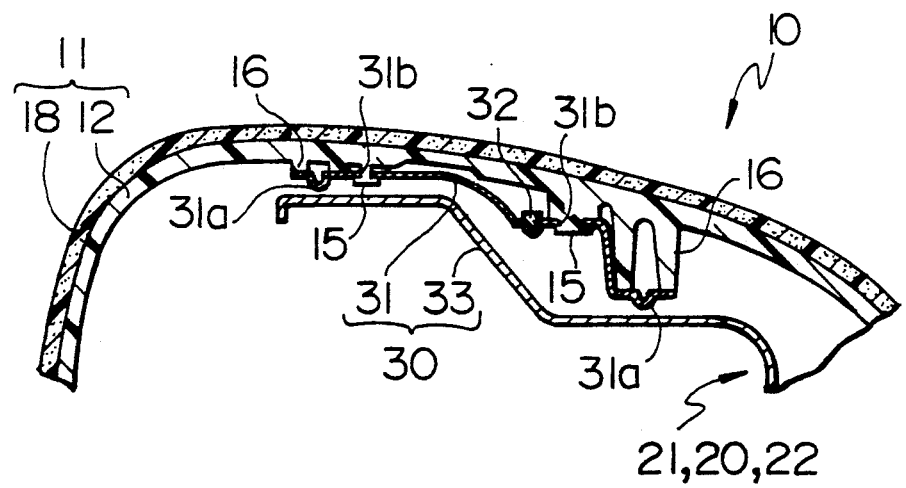
FIG. 5 is a partial cross sectional view which illustrates a horn pad according to the first embodiment of the present invention and taken along line V—V of FIG. 2.
Figure 6:
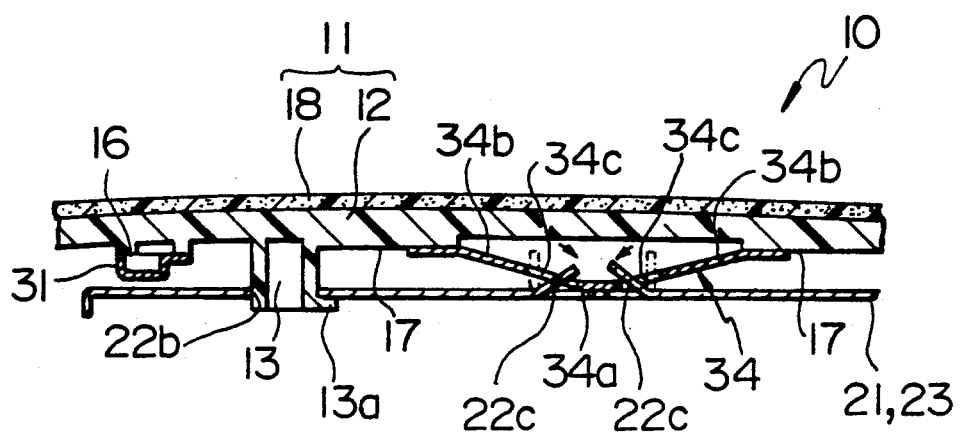
FIG. 6 is a partial cross sectional view which illustrates the horn pad according to the first embodiment of the present invention and taken along line VI—VI of FIG. 2.

The horn pad 10 comprises a pad body 11, an impact energy absorbing body 20 serving as a fastening metal member and a horn switch mechanism 30 (see FIGS. 2, 5 and 6).

Figure 10:
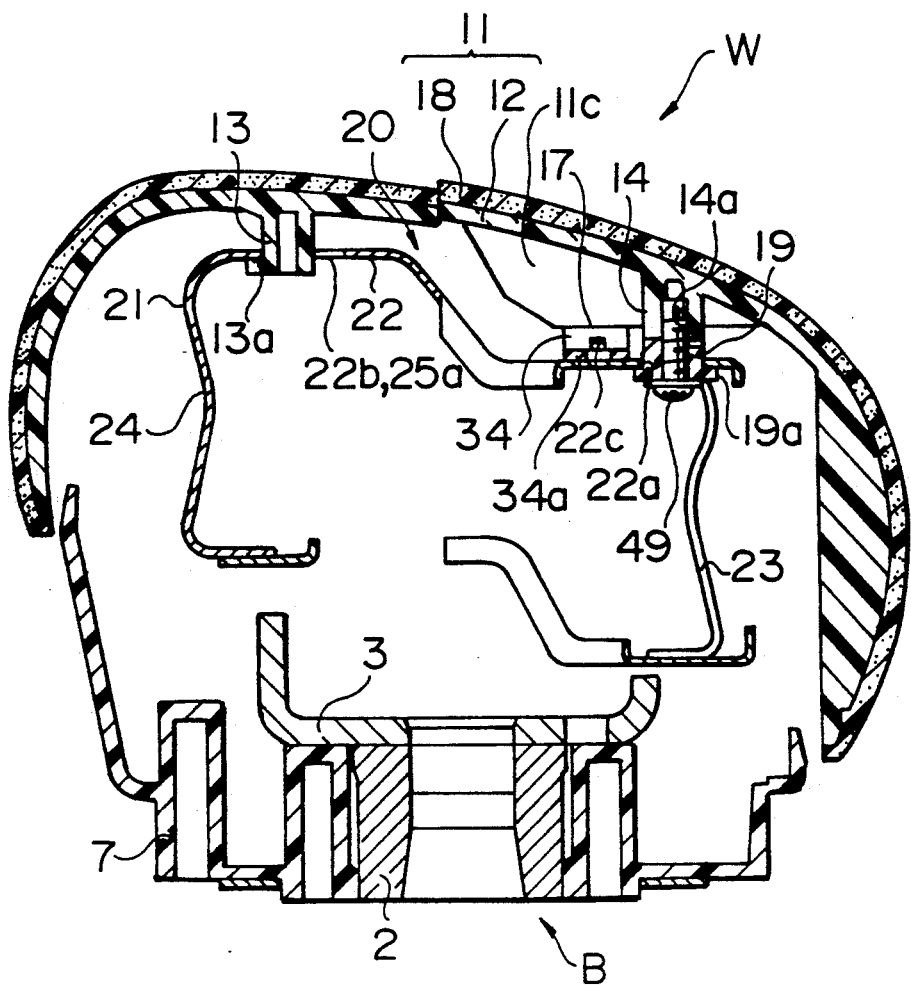
FIG. 10 is a cross sectional view which is taken along line X—X of FIG. 2 and which illustrates the first embodiment of the present invention.

As shown in FIG. 10, the pad body 11 comprises a shell composed of an insert 12 made of a rigid synthetic resin such as polypylene possessing a shape retention characteristic and a cover layer 18 made of a soft synthetic resin such as soft vinyl chloride for covering the insert 12. The pad body 11 further comprises a projecting portion 11c.

As shown in FIGS. 2 and 5, the insert 12 has a plurality of projecting portions 15 for securing two movable contact plates 31 of a horn switch mechanism 30 to predetermined positions. Furthermore, the insert 12 has a plurality of supporting seats 16 for supporting contact portions 31a of the movable contact plate 31. In order to establish a connection between the insert 12 and the impact energy absorbing member 20, the insert 12 has two fitting legs 13 (see FIG. 6) and a fastening boss 14 (see FIG. 10) which has a fastening hole 14a, each of the fastening legs 13 having a flange portion 13a.

Figure 3:
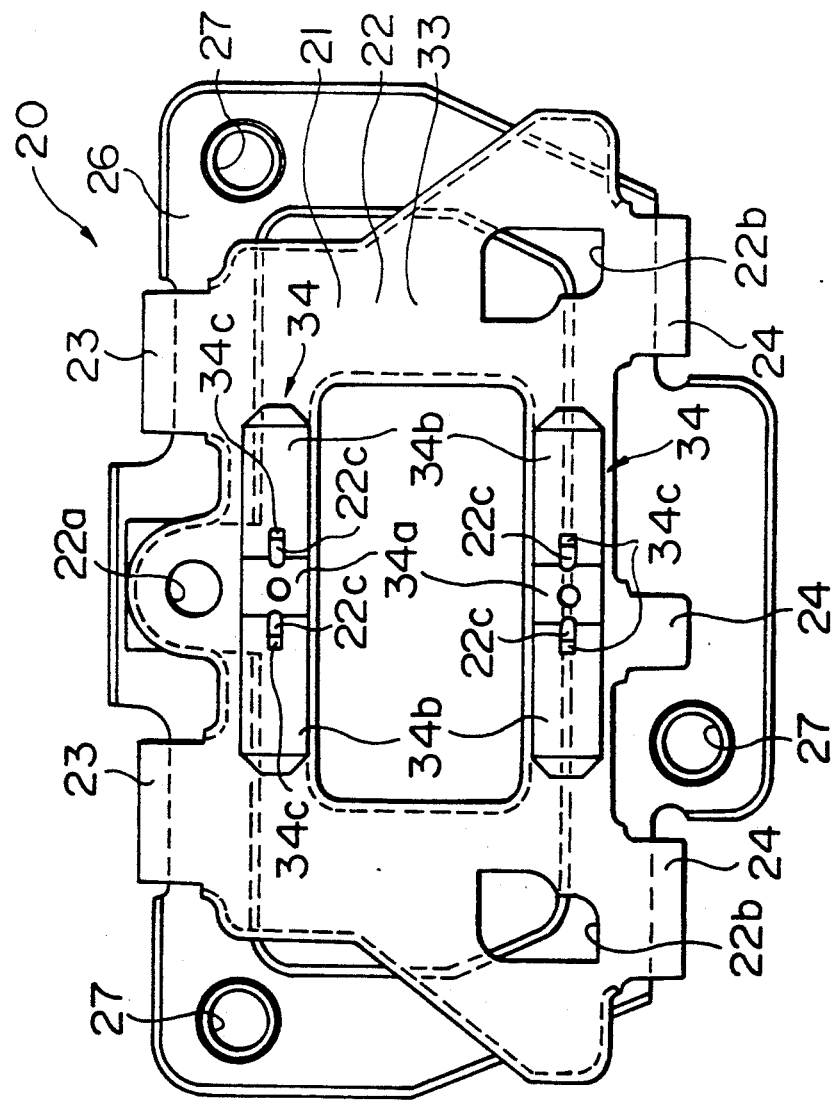
FIG. 3 is a plan view which illustrates an impact energy absorbing member according to the first embodiment of the present invention.

The impact energy absorbing member 20 is constituted by a deformable portion 21 made of sheet metal and having an inverted U-shaped cross section and a base portion 26 formed into a substantially square frame shape (see FIGS. 2, 3 and 10).

The deformable portion 21 has an upper wall portion 22, two side wall portions 23, each of which extends downward from the two end portions of the front portion of the upper wall portion 22, and three side wall portions 24 each of which extends downward from the three end portions of the rear portion of the upper wall portion 22. The lower end portion of each of the side wall portions 23 and 24 is bent so as to be secured to the base portion 26.

The upper wall portion 22 has a fastening hole 22a and two fitting holes 22b formed for the purpose of fastening the pad body 11 to a predetermined position. Furthermore, two leaf springs 34 to be fitted to a caulking projection 22c are secured to the upper wall portion 22 (see FIGS. 2, 6 and 10).

The base portion 26 has three fitting holes 27 at predetermined positions thereof. In addition, a fitting claw 28 made of spring steel is secured to the lower surface of the central portion of the rear portion of the base portion 26 (see FIGS. 4, 7 and 8). The above-described fitting holes 27 and the fitting claw 28 are provided for the purpose of fastening the horn pad 10 to the steering wheel body 1.

The horn switch mechanism 30 comprises two movable contact plates 31 made of sheet metal and secured to the pad body 11, a fixed contact plate 33 constituted by the upper wall portion 22 of the impact energy absorbing member 20 and two leaf springs 34 secured to the fixed contact plate 33 for the purpose of separating the movable contact plate 31 from the fixed contact plate 33 (see FIGS. 2, 5 and 6).

Each of the movable contact plates 31 has contact portions 31a at the two end portions thereof, the contact portion 31a being bent to project downward. Furthermore, each of the movable contact plates 31 has two fastening holes 31b so as to be fastened to the pad body 11. A lead wire 32 acts to connect the movable contact plates 31 to the positive side of a horn operation circuit. The movable contact plates 31 are fastened to the pad body 11 in such a manner that the projecting portions 15 of the insert 12 of the main body 11 are inserted into the corresponding fastening holes 31b before the front end portion of each of the projecting portions 15 is thermally caulked.

As shown in FIGS. 3 and 6, each of the leaf springs 34 has a fixed portion 34a and elastic portions 34b which diagonally upward extend from the two side portions of the fixed portion 34a. A through hole 34c is formed in each of the elastic portions 34b adjacent to the fixed portion 34a. By inserting the caulking projections 22c of the fixed contact plate 33 into the through holes 34c before the caulking projection 22c are bent, the peripheral portion of the fixed portion 34a are fitted to the caulking projections 22c. As a result, each of the leaf springs 34 is secured to the fixed contact plate 33. When the pad body 11 having the movable contact plate 31 is fastened to the fixed contact plate 33, the front portion of the elastic portion 34b of each of the leaf springs 34 comes in contact with a flat portion 17 of the insert 12 of the pad body 11. Therefore, the movable contact plate 31 is urged to be separated from the fixed contact plate 33 by the urging force of each of the leaf springs 34.

When the pad body 11 having the movable contact plate 31 is fastened to the fixed contact plate 33 (the upper wall portion 22) of the impact energy absorbing member 20, the flange portion 13a of each of the fitting legs 13 of the pad body 11 is fitted to the peripheral portion of each of the fitting holes 22b of the upper wall portion 22. Furthermore, a spacer 19 with a flange made of a synthetic resin such as polyacetal and formed into a substantially cylindrical shape is inserted into the fastening hole 22a of the upper wall 22. Then, the screw 49 is, via the above-described spacer 19, inserted into the fastening hole 14a of the fastening boss 14 of the insert 12 so that the pad body 11 is fastened to the fixed contact plate 33 (see FIGS. 2, 6 and 10). When the flange portion 13a of the fitting leg 13 is fitted to the peripheral portion of each of the fitting holes 22b, the fitting leg 13 is inserted into each of the fitting holes 22b before the pad body 11 is slid rearward (in a downward direction when viewed in FIG. 2) (see FIG. 11).

The fixed contact plate 33, which is the upper wall portion 22 of the deformable portion 21 of the impact energy absorbing member 20 is connected to the negative pole side of the horn operation circuit via the side wall portion 24 of the deformable portion 21, the base portion 26, the fitting claw 28, a fitting member 38 to be described later, the boss plate 3 and the boss 2.

Figure 11:
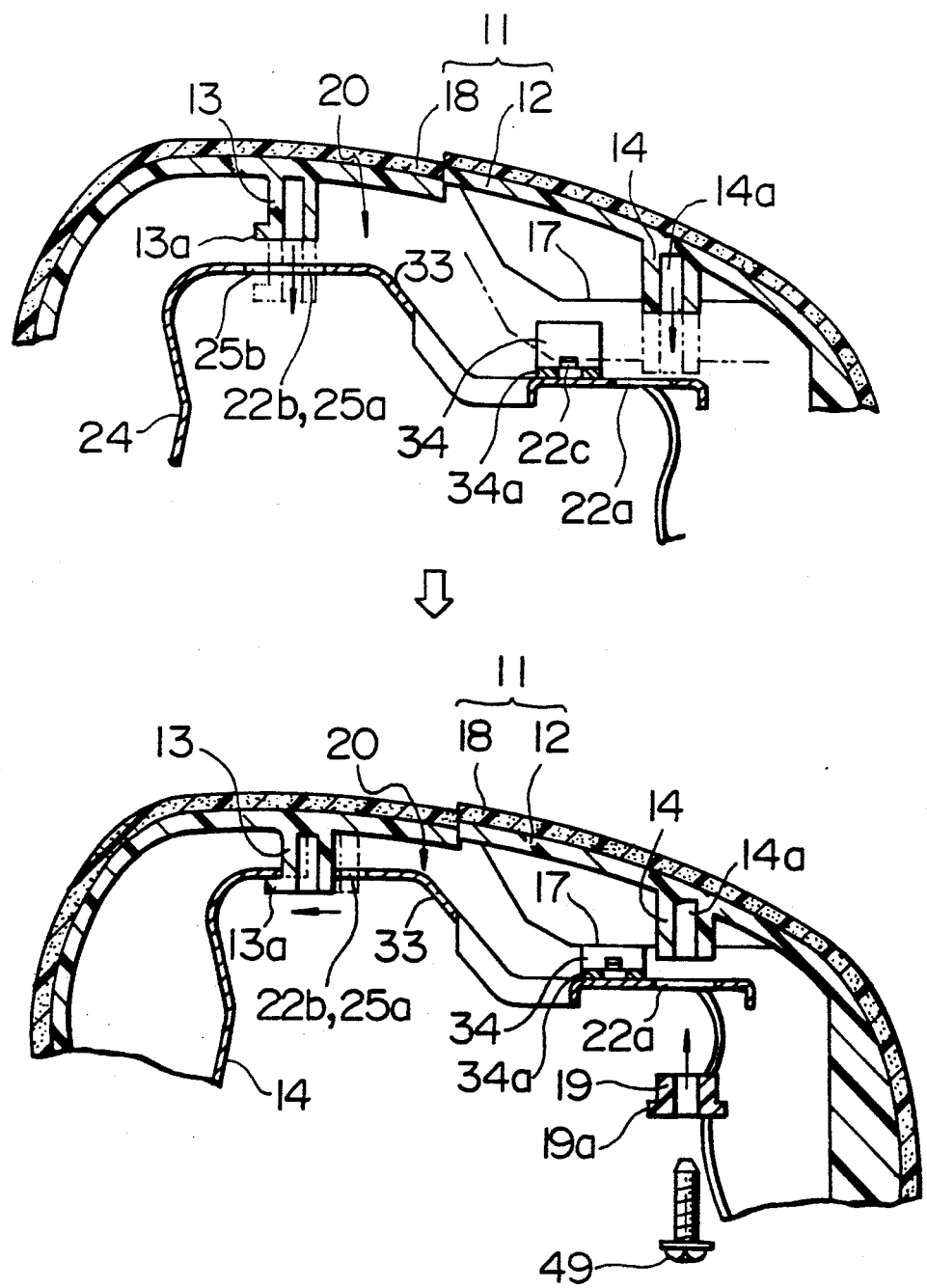
FIG. 11 is schematic cross sectional view which illustrates a method of assembling the horn pad and the impact energy absorbing member in a state before they are assembled as shown in FIG. 10.
Figure 12:
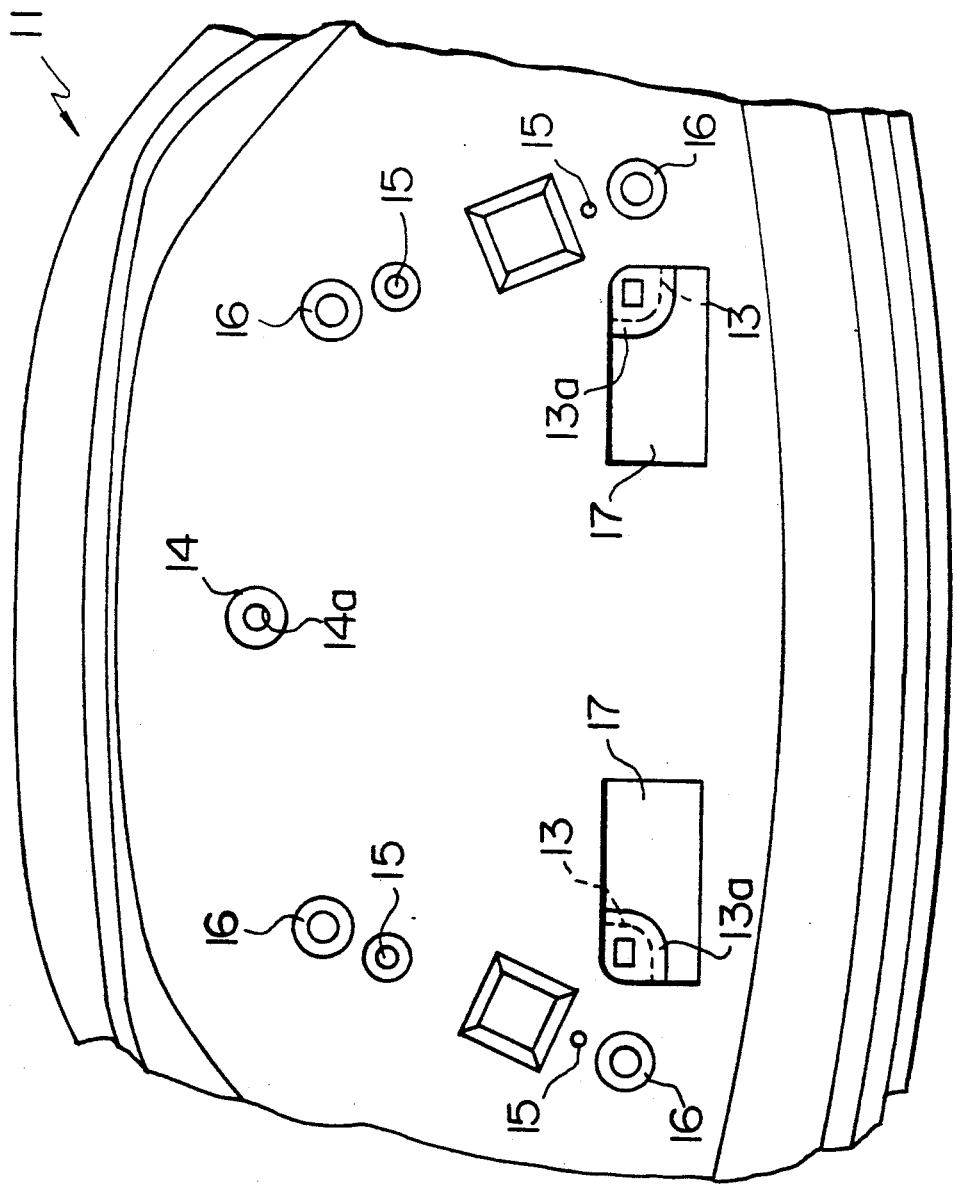
FIG. 12 is a reverse view which illustrates the horn pad according to the first embodiment of the present invention.

Then, the method of fastening the pad body 11 to the fixed contact plate 33 according to this embodiment will now be described in detail. As shown in FIG. 11, the leaf spring 34 is placed on the fixed contact plate 33 at a position between the fixed contact plate 33 and the pad body 11. Then, each of the fitting legs 13 of the pad body 11 is inserted into an insertion portion 25a of each of the fitting holes 22b of the fixed contact plate 33 before the shaft portion of each of the fitting legs 13 is slid into a fitting opening portion 25b of each of the fitting holes 22b. As a result, the flange portion 13a of each of the fitting legs 13 is fitted to the peripheral portion of each of the fitting opening portions 25b.

Then, the spacer 19 is, from a lower portion, inserted into the fastening hole 22a of the fixed contact plate 33 in a direction toward the pad body 11 so that a flange portion 19a of the space 19 is brought into contact with the peripheral portion of the fastening hole 22a. The placed spacer 19 is screwed to the reverse side of the pad body 11 by using the screw 49 inserted into the hole 14a for a screw. As a result, the flange portion 13a of each of the fitting legs 13 fasten the peripheral portion of the fitting opening portion 25b of each of the fitting holes 22b of the fixed contact plate 33 and the flange portion 19a of the spacer 19 fasten the peripheral portion of the fastening hole 22a of the fixed contact plate 33 so that the pad body 11 is fastened to the fixed contact plate 33.

Therefore, according to this embodiment, the horn pad body 11 can be fastened to the fixed contact plate 33 by one spacer 19 and the screw 49.

Figure 1:
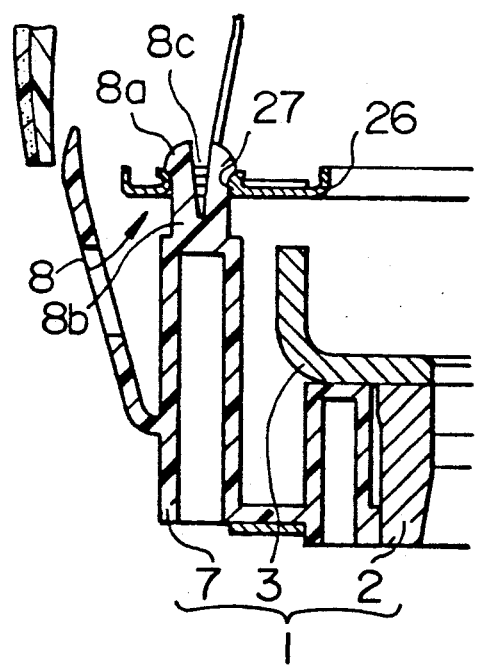
FIG. 1 is a cross sectional view which illustrates a portion of a first embodiment of the present invention and taken along line I—I of FIG. 2.
Figure 4:
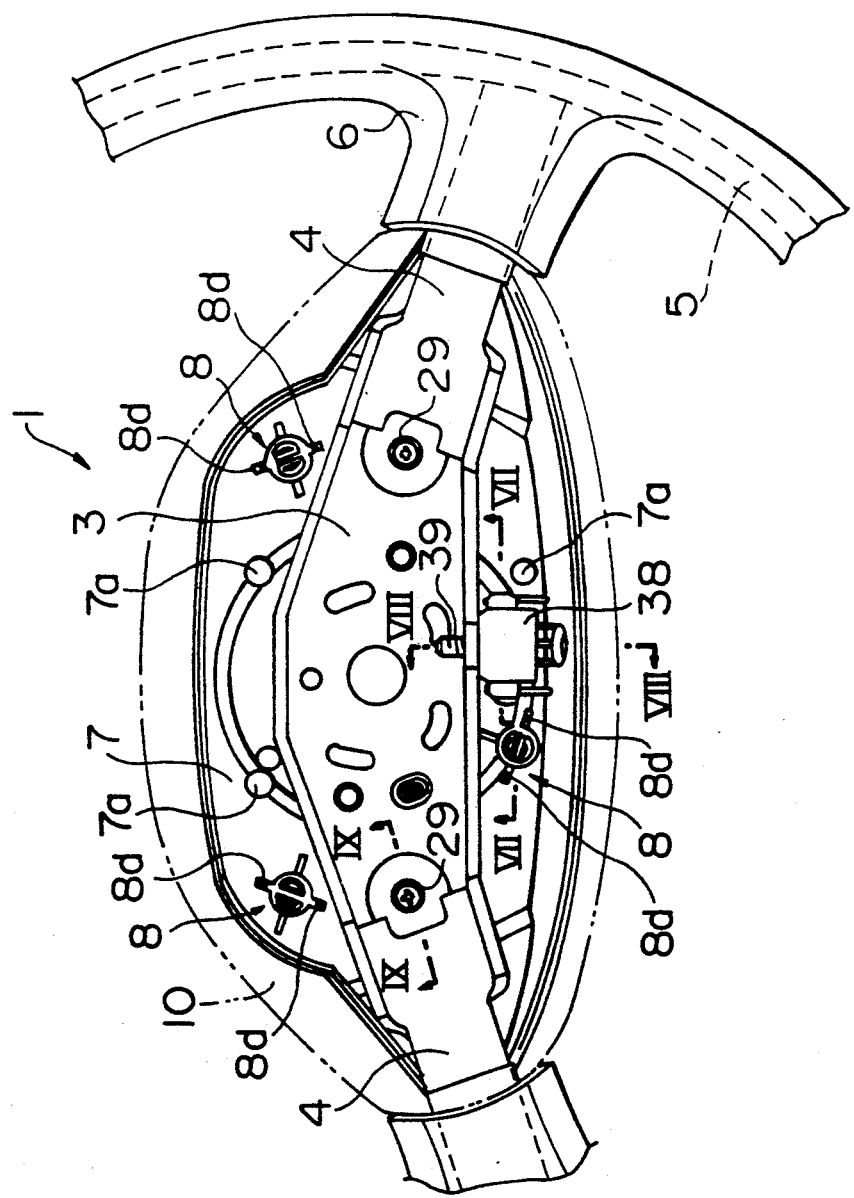
FIG. 4 is a plan view which illustrates a steering wheel body according to the first embodiment of the present invention.
Figure 7:
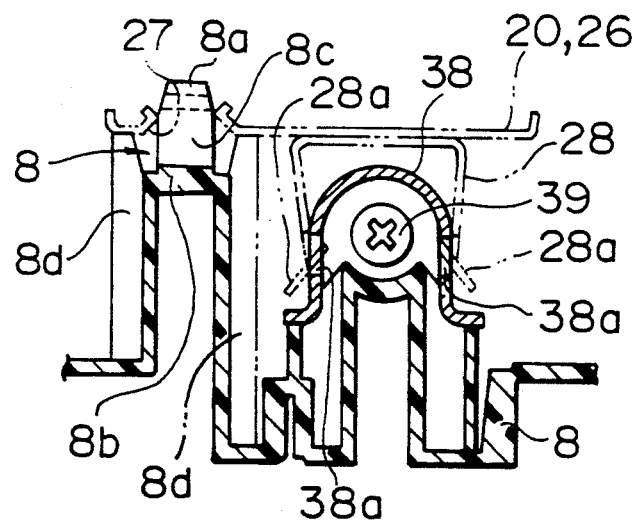
FIG. 7 is a partial cross sectional view taken along line VII—VII of FIG. 4.

As shown in FIGS. 1, 4 and 7, the steering wheel body 1 is arranged in such a manner that a fitting leg 8 is formed to correspond to each of the fitting holes 27 of the base portion 26 of the impact energy absorbing member 20 at a predetermined position of the lower cover 7 serving as the synthetic resin portion. The fitting leg 8 has a head portion 8a having a slit 8c formed therein and thereby the diameter of which can be reduced. Furthermore, the lower cover 7 has supporting projections 7a and 8d at predetermined positions in the peripheral portions of the fitting legs 8, the supporting projections 7a and 8d being positioned in contact with the lower surface of the base portion 26 of the impact energy absorbing body 20 in order to prevent the downward movement of the horn pad 10 exceeding a predetermined quantity at the time of fastening the horn pad 10.

Figure 8:
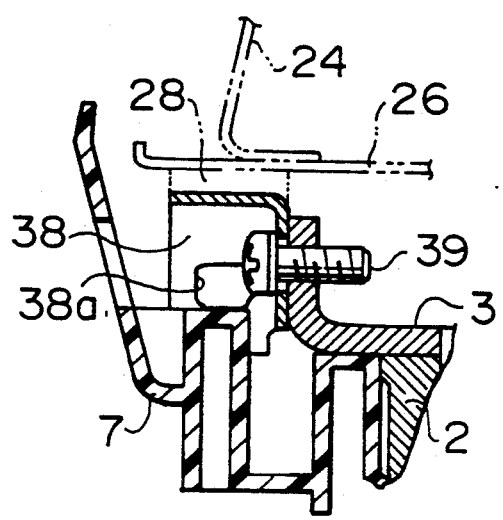
FIG. 8 is a partial cross sectional view taken along line VIII—VIII of FIG. 4.
Figure 9:
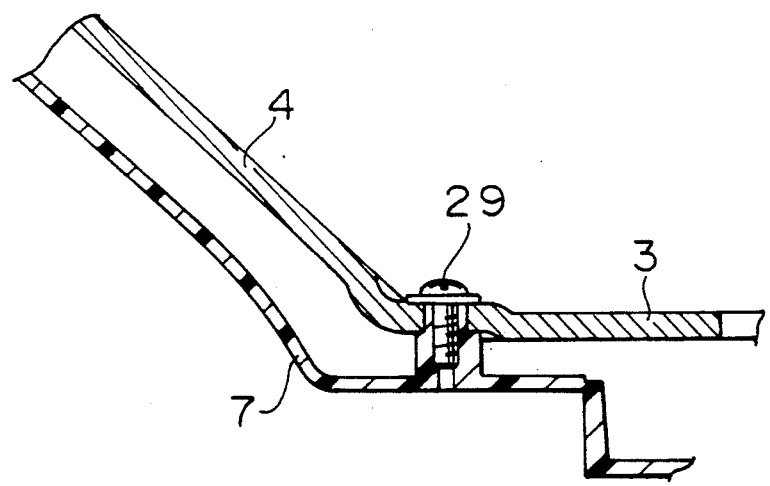
FIG. 9 is a partial cross sectional view taken along line IX—IX of FIG. 4.

As shown in FIGS. 4, 7 and 8, in order to prevent the separation of the horn pad 10 after it has been fastened, the steering wheel body 1 is further arranged in such a manner that a fitting member 38 of a substantially semi-cylindrical shape is secured by a screw 39 at the central portion at the rear of the boss plate 3, the fitting member 38 securing the fitting claw 28 fixed to the lower surface of the base portion 26 in such a manner that the fitting claw 28 cannot be separated from the same. The fitting claw 28 is secured to the fitting member 38 in such a manner that stopper claw portions 28a of the fitting claw 28 are fitted to the peripheral portions of two fitting holes 38a formed in the side surfaces of the fitting member 38.

Therefore, the horn pad 10, to which the pad body 11, the impact energy absorbing member 20 and the horn switch mechanism 30 are fastened, is fastened to the steering wheel body 1 as follows: the horn pad 10 is moved downwards from an upper portion to the lower portion with respect to the position of the steering wheel body 1 in such a manner that each of the fitting legs 8 of the lower cover 7 is inserted into each of the fitting holes 27 of the base portion 26 of the impact energy absorbing member 20 and the fitting claw 28 of the base portion 26 is fitted around the fitting member 38 which is fixed, with the screw 39, to the boss plate 3. Thus, the head portion 8a of each of the fitting legs 8 fastens the peripheral portion of the fitting hole 27. Furthermore, the fitting claw 28 is fixed by the fitting member 38 in such a manner that the fitting claw 28 cannot be separated. As a result, the horn pad 10 can be fastened to the steering wheel body 1.

According to this embodiment, the fitting legs 8 are integrally formed with the lower cover 7 of the steering wheel body 1, the lower cover 7 being made of the rigid synthetic resin. Therefore, the fitting legs 8 can be easily formed at the time of molding the lower cover 7. As a result, the conventional necessity of screw-fixing the fitting legs can be eliminated, causing the screw-fixing work to be eliminated.

The fitting holes 27 formed in the impact energy absorbing member 20 are, according to this embodiment, formed in the base portion 26 made of the sheet metal. Therefore, they can be easily formed when the base portion 26 is manufactured by press working. As a result, they can be formed easier than the fitting holes formed by drilling the boss plate of the conventional steering wheel body.

Therefore, according to this embodiment, the screw-fixing work can be omitted from the process of fitting the pad 10. As a result, the number of the parts required when the pad having the impact energy absorbing body 20 is fastened to the steering wheel body 1 can be reduced. As a result, the number of the manufacturing processes can be reduced. The structure for preventing the separation of the horn pad 10, that is, the fitting claw 28 and the fitting member 38 are arranged similarly to those according to the conventional structure. Therefore, they will not deteriorate the effects obtainable from this embodiment of the present invention.

After the steering wheel W according to this embodiment has been mounted on the vehicle, the horn pad 10 is pressed downwards. Then, the spacer 19 and the shaft portion of the fitting leg 13 respectively slide on the inner surface of each of the fastening holes 22a and the fitting hole 22b. Therefore, the horn pad 10 moves downward against the urging force of each of the leaf springs 34. As a result, the contact portion 31a of each of the movable contact plates 31 secured to the horn pad 10 is brought into contact with the fixed contact plate 33, causing the horn to be operated.

According to this embodiment, although the structure is arranged in such a manner that two fitting legs 13 are formed in the horn pad 10, the number of the fitting legs 13 can be reduced to one if the fixed contact plate 33 can be fastened while arranging satisfactory balance.

Next, a second embodiment of the present invention will now be described with reference to FIGS. 13 to 17.

Figure 13:
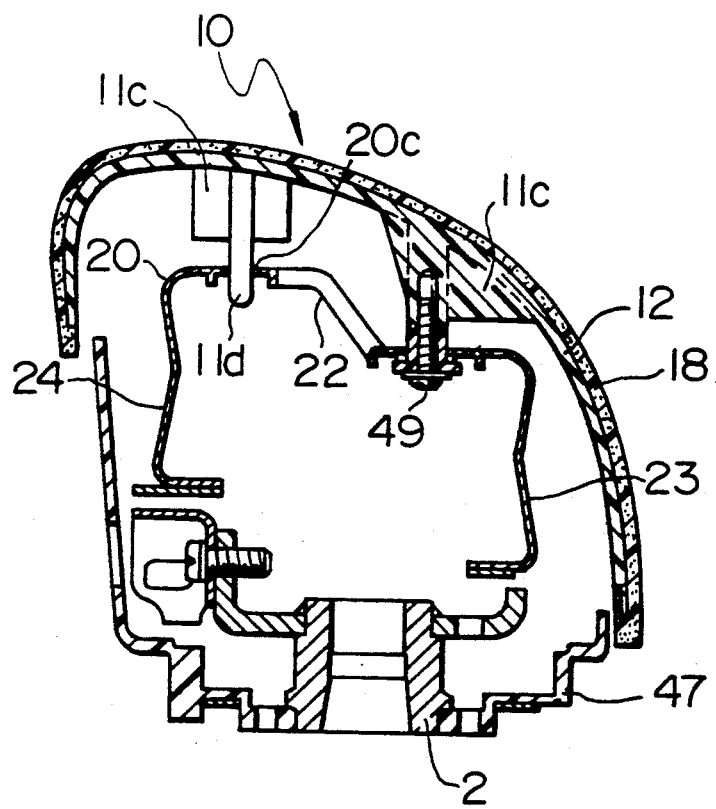
FIG. 13 is a cross sectional view which illustrates a second embodiment of the present invention and taken along line XIII—XIII of FIG. 14.

As shown in FIG. 13, the pad 10 is constituted by a double-layered shell structure composed of the insert 12 made of a rigid synthetic resin such as polypropylene and having inverted J-shape cross section and the cover layer 18 formed by a soft synthetic resin such as polyvinyl chloride on the surface of the insert 12. The pad 10 includes an impact energy absorbing member 20 via, a horn mechanism (omitted from illustration), the impact energy absorbing member 20 being fixed to the projecting portion 11c with the screw 49. The pad 10 is considerably inclined in such a manner that the upper wall portion is inclined forward when the pad 10 is fastened to the upper portion of the boss portion B of the steering wheel body 1 for the purpose of improving the visibility of the meters disposed in front of the steering wheel body 1. In principle, the pad 10 may be arranged in such a manner that the portion which defines the shape of the pad and the projecting portion 11c of the reverse side of the upper wall may be made of the rigid synthetic resin. Another structure may be employed in such a manner that the overall body of the pad is made of the rigid synthetic resin. Another structure may be composed of three layers arranged in such a manner that a thin soft synthetic resin cover layer is formed on the reverse side of the above-described pad 10.

As shown in FIG. 13, the impact energy absorbing member 20 is formed by bending a metal sheet in such a manner that the side wall portions 23 and 24 of the two longitudinal end portions of the impact energy absorbing member 20 have the same height. The upper wall portion 22 of the impact energy absorbing member 20 has a stepped portion which corresponds to the above-described inclination of the upper wall portion of the pad 10, the stepped portion therefore having a front portion having a reduced height. Therefore, the stepped portion thus formed enables the above-described inclination of the upper wall portion of the pad 10 to be further inclined than the inclination of the upper wall portion of the conventional pad.

The pad 10 ha the projecting portions 11c formed on the reverse side of the upper wall thereof, the projecting portions 11c being formed at positions corresponding to the portions of the upper wall portion 22 of the above-described impact energy absorbing member 20 adjacent to the upper end portion of the side walls. The projecting portions 11c act to deform the side wall portions 23 and 24 of the above-described impact energy absorbing member 20 so as to crush them, the projecting portions 11c being integrally formed with the insert 12 at a predetermined interval from the above-described upper wall portion 22. Furthermore, the above-described pad 10 is disposed at a predetermined interval while overlapping a portion thereof so that its side wall does not come in contact with the side wall of the above-described lower cover 47 when the pad 10 is fastened to the upper surface of the boss portion B.

Then, a case where impacting force downwards acts from an upper portion on the central portion of the upper wall of the pad 10 according to this embodiment will now be described.

When impacting force acts downwards from an upper portion on the central portion of the upper wall of the pad 10, the pad 10 is not considerably deformed by virtue of the rigidity possessed by the rigid synthetic resin of the insert 12 of the pad 10. Therefore, it is moved downwards while substantially maintaining its initial shape. At this time, since the side wall of the pad 10 and that of the lower cover 47 do not come in contact with each other as described above, the side wall of the pad 10 does not hinder the above-described downward movement of the pad 10. Therefore, the projecting portions 11c integrally formed with the reverse side of the insert 12 come in contact with the upper wall portion 22 adjacent to the upper end portion of the side walls at the two longitudinal end portions of the impact energy absorbing member 20. As a result, the projecting portions 11c deform the side wall portions 23 and 24 so as to crush them so that a predetermined energy absorption is performed. Therefore, according to the steering wheel according to this embodiment, even if the impact force acts substantially perpendicularly from an upper portion on the central portion of the side wall portion of the pad 10, the impact force is transmitted to the projecting portions 11c of the pad 10, the impact force then acting on the upper wall portion 22 adjacent to the upper end portion of the side walls of the impact energy absorbing member 20. Therefore, undesirable component force, which is generated in the conventional structure and which pushes rearwards the impact energy absorbing member, is not generated. Therefore, the side wall portions 23 and 24 of the impact energy absorbing member 20 can be effectively deformed so as to crush them.

As shown in FIG. 13, the projecting portion 11c may be formed into a plate-like rib or a continuous plate-like rib substantially paralleling the side walls 23 and 24 formed at the longitudinal end portions of the impact energy absorbing member 20. As shown in FIG. 13, the projecting portion 11c may have an insertion portion 11d to be inserted into a hole 20c formed in the upper wall portion 22 of the impact energy absorbing member 20 and having a smaller diameter than that of the hole 20c. The insertion portion 11d thus-constituted is inserted into the above-described hole 20c so that the position, at which the projecting portion 11c comes in contact with the upper wall portion 22 adjacent to the upper end portion of the side wall of the impact energy absorbing member 20 when the impact energy absorbing member 20 is deformed, is restricted.

Figure 16:
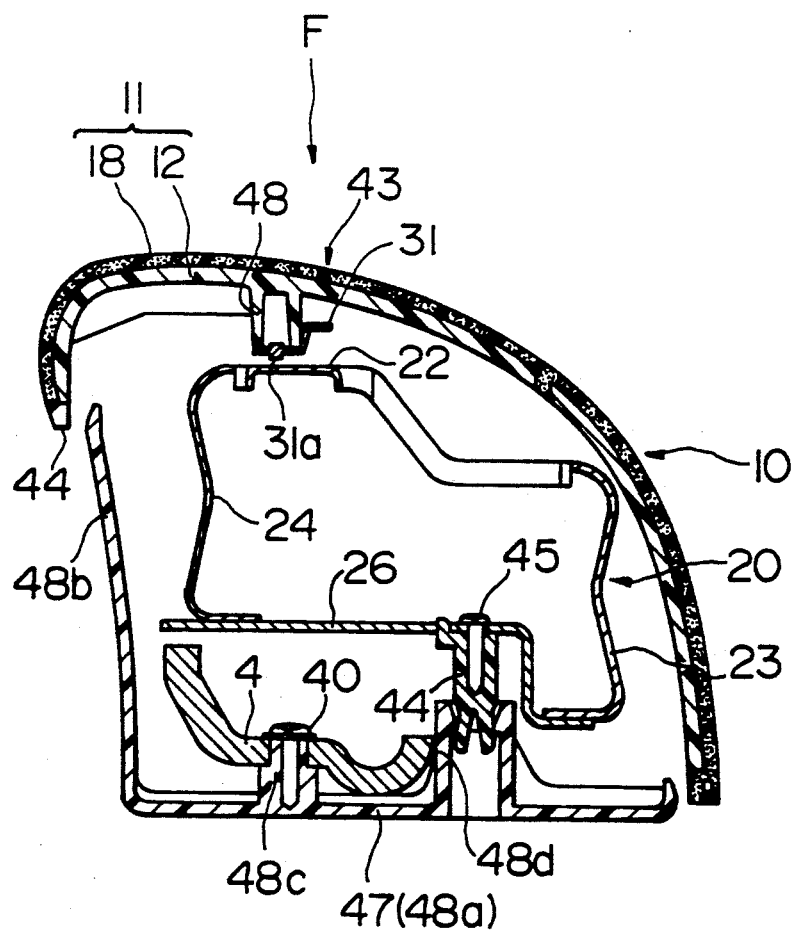
FIG. 16 is a cross sectional view taken along line XVI—XVI of FIG. 15.

The lower cover 47 is, as shown in FIG. 16, made of a rigid synthetic resin such as polypropylene and has a bottom wall 48a and an upper peripheral wall 48b extending upwards from the peripheral portion of the bottom wall 48. The lower cover 47 is fastened to the boss plate 4 with a screw 40 via a fastening boss 48c for fastening the bottom wall 48a. Furthermore, the bottom wall 48a has three boss holes 48d formed therein (see FIG. 15).

As shown in FIG. 16, the pad 10 comprises the pad body 11 and the impact energy absorbing member 20.

The impact energy absorbing member 20 is constituted by a base portion 26 and a deformable portion 23, 24 each of which is manufactured from a sheet metal, the base portion 26 being disposed in the lower portion thereof and having a square frame shape when viewed from an upper portion. The deformable portion 23, 24 has a substantially inverted U-shaped side view.

The base portion 26 has fitting legs 44, each of which is disposed so as to be inserted and fixed into each of the boss holes 48d formed in the lower cover 47 with screws 45 (see FIG. 16).

The deformable portion comprises the upper wall portion 22 and deformable leg portions 23 and 24 which downward extend from the two longitudinal end portions of the upper wall portion 22 so as to be connected to the base portion 26. The deformable leg portions 23 and 24 thus formed act to absorb impact energy by their buckling deformation.

Figure 14:
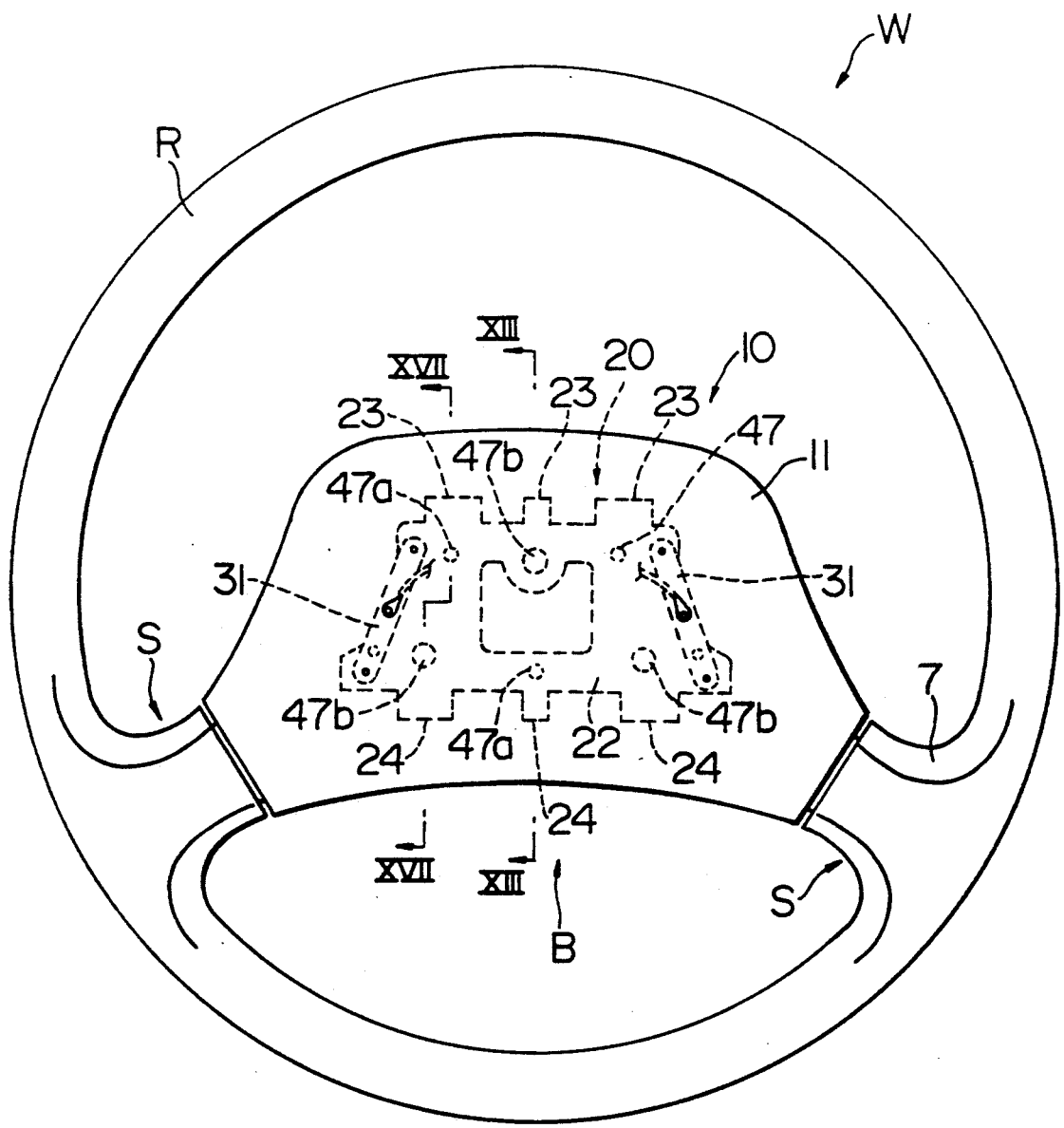
FIG. 14 is a plan view which illustrates the second embodiment of the present invention.
Figure 15:
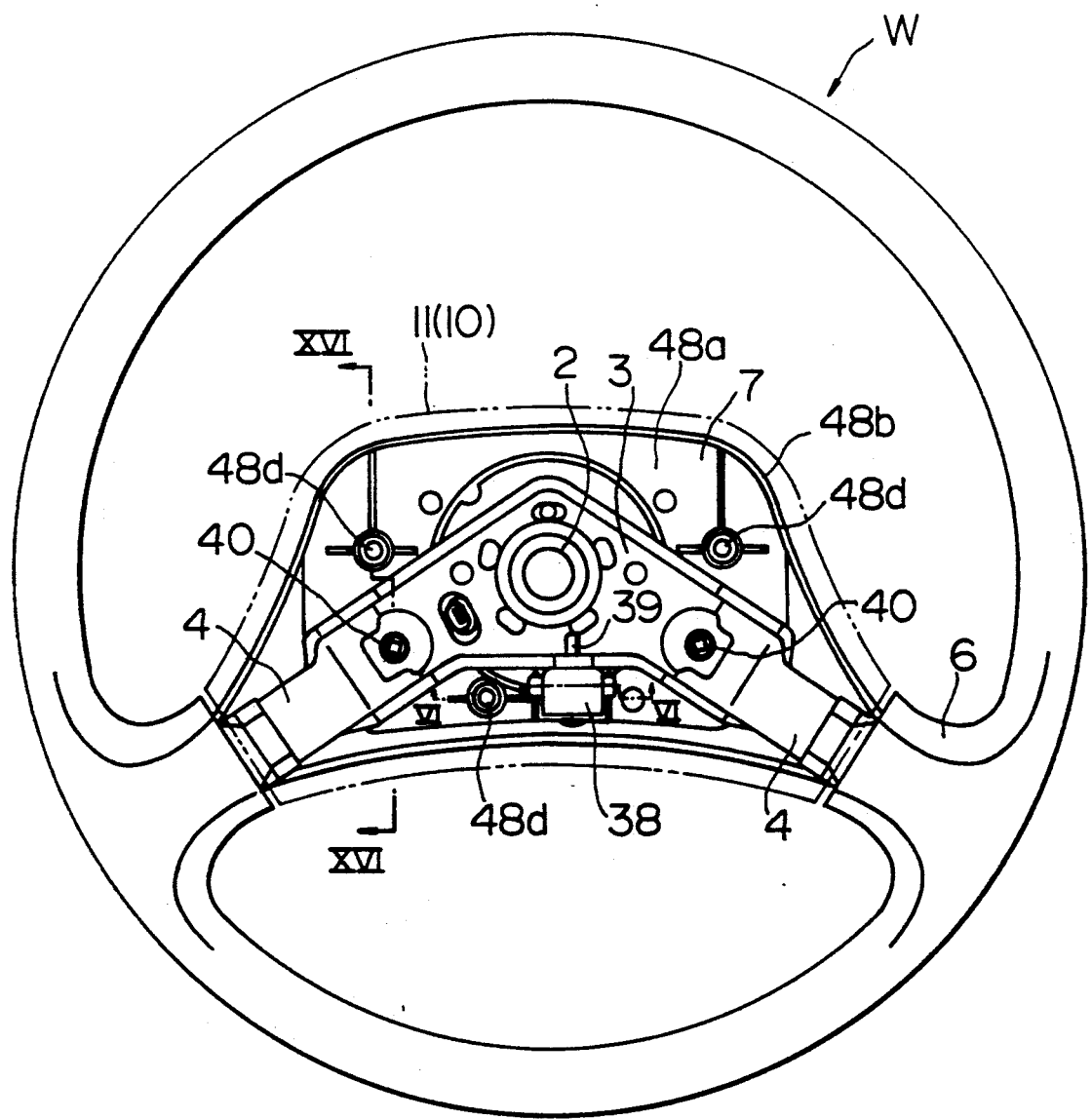
FIG. 15 is a plan view which illustrates a state where a pad according to the second embodiment has been removed.
Figure 17:
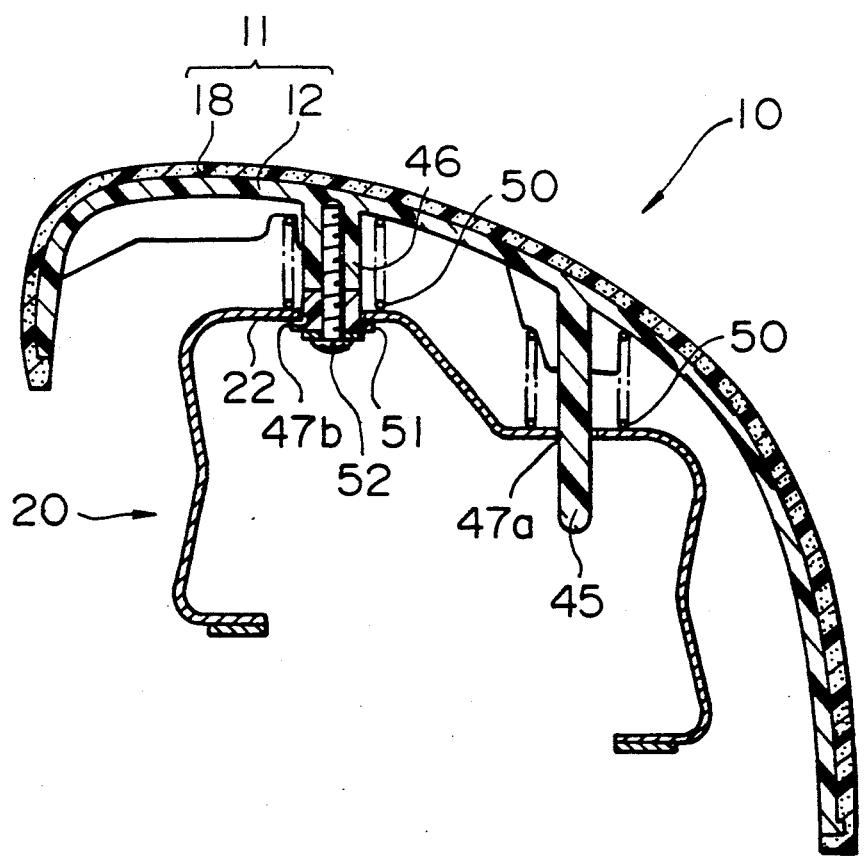
FIG. 17 is a cross sectional view which is taken along line XVII—XVII of FIG. 14 and which illustrates the pad and an impact energy absorbing member according to the second embodiment of the present invention.

As shown in FIGS. 14 and 17, the upper wall portion 22 has guide holes 47a respectively disposed on the two side portions of the front portion and the central portion of the rear portion thereof, the guide holes 47a acting to guide guide rods 45 of the pad body 11 when the horn is operated. Furthermore, fastening holes 47b for fastening the pad body 11 are formed at the central portion of the front portion of the upper wall portion 22 and the two side portions of the rear portion of the same.

As shown in FIGS. 14 and 16, the pad body 11 comprises the insert 12 formed into a substantially similar shape to the pad body 11 and made of a rigid synthetic resin such as polypropylene. The pad body 11 further comprises the cover layer 18 which covers the outer surface of the insert 12 and which is made of a soft synthetic resin such as soft vinyl chloride.

Furthermore, the pad body 11 comprises an upper wall 43 and a lower peripheral wall 44 projecting downward from the peripheral portion of the upper wall 43. The lower peripheral wall 44 is formed in such a manner that its lower end portion is positioned outside the outer surface of the upper peripheral wall 48b of the lower cover 47. Furthermore, the portion of the lower peripheral wall 44 adjacent to the upper peripheral wall 48b is formed in a substantially perpendicular direction. As a result, the lower peripheral wall 44 does not come in contact with the upper peripheral wall 48b of the lower cover 47 when the deformable leg portions 23 and 24 of the impact energy absorbing member 20 are buckling-deformed due to the effect of impact force F acting on the pad body 11. The portion of the pad body 11 positioned above the spoke portion S has no peripheral wall which downward extends from the upper wall 43 and with which a predetermined space can be secured for the purpose of preventing an undesirable contact with each of the spoke cores 5 at the time of the deformation of the impact energy absorbing member 20.

The portion of the pad body 11 corresponding to the reverse side of the insert 12 has, as shown in FIG. 17, three guide rods 45 to be inserted into the guide holes 47a formed in the upper wall portion 22 of the impact energy absorbing member 20. Furthermore, the same portion has three fastening bosses 46 for fastening the pad body 11 to the upper wall portion 22 of the impact energy absorbing member 20. Each of the fastening bosses 46 is formed at a position which corresponds to each of fastening holes 47b formed in the upper wall portion 22 of the energy absorbing member 20.

Thus, the pad body 11 can be fastened to the impact energy absorbing member 20 by fixing a spacer 51 with a flange to be inserted into each of the fastening holes 47b from a lower portion to each of the fastening bosses 46 by using a screw 52. In addition, coil springs 50 are disposed between the pad body 11 and the impact energy absorbing member 20 in such a manner that the coil spring 50 is placed around the guide rod 45 positioned in the front portion and the other coil spring 50 is placed around the spacer 51 with a flange positioned in the rear portion so that the pad body 11 is urged upwards. The distance of the pad body 11 from the upper wall portion 22 is determined by the flange portion of the spacer 51.

Furthermore, as shown in FIGS. 14 and 16, the movable contact plates 31, which constitute the horn switch mechanism, are, by using screws, secured to the reverse side of the insert 12 in such a manner that the movable contact plates 31 are screw-fixed to the fastening bosses formed on the two sides of the insert 12. Reference numeral 48 represents a supporting projection for supporting the contact 31a of each of the movable contact plates 31.

The horn switch mechanism according to this embodiment comprises the movable contact plates 31 and the upper wall portion 22 of the impact energy absorbing member 20.

Then, a case where impact force F acts on the pad body 11 according to this embodiment will now be described. When the pad body 11 is moved downwards, the impact energy absorbing member 20 is crushed while buckling-deforming the deformable leg portions 23 and 24.

The above-described downward movement of the pad body 11 is smoothly performed because the pad body 11 does not come in contact with the lower cover 47 by virtue of the structure arranged in such a manner that the lower peripheral wall 44 of the pad body 11 is disposed outside the upper peripheral wall 48b of the lower cover 47 adjacent to the steering wheel body. As a result, the deformable leg portions 23 and 24 of the impact energy absorbing member 20 are buckling-deformed as desired so that a predetermined quantity of the impact force F is absorbed. Therefore, similar effects to that obtainable from the above-described embodiment of the present invention can be obtained.

Although the horn switch mechanism is disposed in the pad 11 according to this embodiment, the pad body 11 may, of course, be directly secured to the upper wall portion 22 of the deformable portion of the impact energy absorbing member 20 in a case where the horn switch mechanism is not provided for the steering wheel.

Although the invention has been described in its preferred form with a certain degree of particularly, it is understood that the present invention is not limited to the embodiments described herein. Various modifications and arrangements of the present invention are intended to be included within the spirit and the scope of the appended claims.

What is claimed is:

1. A steering wheel comprising:
   a boss portion to which a steering shaft is fastened;
   a wheel portion disposed around said boss portion;
   spokes for connecting said boss portion and said wheel portion;
   an energy absorbing member disposed on said boss portion and made of sheet metal, said energy absorbing member including:
   a pair of side walls disposed opposite one another and being deviated from each other in an axial direction of said steering shaft; and
   an upper wall having two end portions extending in a direction perpendicular to an axis of said steering shaft and connected to upper end portions each of each of said pair of side walls, respectively and an inclined portion for connecting said two end portions; and
   a pad for covering said energy absorbing member, said pad including:
   a shell disposed an interval from said energy absorbing member; and
   a projecting portion extending from said shell toward at least one of said end portions of said energy absorbing member.

2. A steering wheel according to claim 1, wherein said pair of side walls have substantially the same length in said axial direction of said steering wheel shaft.

3. A steering wheel according to claim 1, wherein said energy absorbing member further includes a base portion connecting lower end portions of said side walls and connected to said boss portion.

4. A steering wheel according to claim 3, wherein said projecting portion is a rib having, at the distal end thereof, a surface parallel to the end portion of said upper wall of said energy absorbing member.

5. A steering wheel according to claim 3, wherein said pad is made of a rigid resin, includes a horn contact and is fastened in such a manner that it moves relative to said energy absorbing member; and wherein said energy absorbing member has a second horn contact, so that said pad and said energy absorbing member form a horn switch.

6. A steering wheel according to claim 3, wherein said base portion includes a plurality of fitting holes and said boss portion includes fitting projections to be fitted into said fitting holes.

7. A steering wheel according to claim 3, wherein said boss portion includes a plurality of fitting holes and said base portion includes fitting projections to be fitted into said fitting holes.

8. A steering wheel comprising:
   a boss portion to which a steering shaft is fastened;
   a wheel portion disposed around said boss portion;
   spokes for connecting said boss portion and said wheel portion;
   an energy absorbing member disposed on said boss portion and made of sheet metal, said energy absorbing member including:
   a pair of side walls disposed opposite one another and being deviated from each other in an axial direction of said steering shaft; and
   an upper wall having two end portions extending in a direction perpendicular to an axis of said steering shaft and connected to upper end portions each of each of said pair of side walls, respectively and an inclined portion for connecting said two end portions;
   a base portion connecting lower end portions of said side walls, and connected to said boss portion; and
   a pad for covering said energy absorbing member, said pad including:
   a shell disposed an interval from said energy absorbing member; and
   a projecting portion extending from said shell toward at least one of said end portions of said energy absorbing member;
   wherein said pad is made of a rigid resin, includes a horn contact and is fastened in such a manner that it moves relative to said energy absorbing member;
   wherein said energy absorbing member has a second horn contact, so that said pad and said energy absorbing member form a horn switch; and
   wherein a leaf spring is disposed between said pad and said energy absorbing member, said leaf spring being secured to said end portion of said upper wall of said energy absorbing member by a claw integrally formed with said energy absorbing member.

9. A steering wheel according to claim 8, wherein said pair of side walls have substantially the same length in said axial direction of said steering wheel shaft.

10. A steering wheel according to claim 8, wherein said projecting portion is a rib having, at the distal end thereof, a surface parallel to the end portion of said upper wall of said energy absorbing member.

11. A steering wheel according to claim 8, wherein said base portion includes a plurality of fitting holes and said boss portion includes fitting projections to be fitted into said fitting holes.

12. A steering wheel according to claim 8, wherein said boss portion includes a plurality of fitting holes and said base portion includes fitting projections to be fitted into said fitting holes.

13. A steering wheel comprising:
   a boss portion to which a steering shaft is fastened;

a wheel portion disposed around said boss portion;

spokes for connecting said boss portion and said wheel portion;

an energy absorbing member disposed on said boss portion and made of sheet metal, said energy absorbing member including:
- a pair of side walls disposed opposite one another and being deviated from each other in an axial direction of said steering shaft; and
- an upper wall having two end portions extending in a direction perpendicular to an axis of said steering shaft and connected to upper end portions each of each of said pair of side walls, respectively and an inclined portion for connecting said two end portions;
- a base portion connecting lower end portions of said side walls, and connected to said boss portion; and
- a pad for covering said energy absorbing member, said pad including:
  - a shell disposed an interval from said energy absorbing member; and
  - a projecting portion extending from said shell toward at least one of said end portions of said energy absorbing member;

wherein said pad is made of a rigid resin, includes a horn contact and is fastened in such a manner that it moves relative to said energy absorbing member; and wherein said energy absorbing member has a second horn contact, so that said pad and said energy absorbing member form a horn switch, said steering wheel further comprising:
- a fitting leg projecting from the reverse side of said pad and having a shaft portion with a flange portion formed at the distal end thereof;
- a fastening hole formed in one of the end portions of said upper wall of said energy absorbing member;
- a fitting hole formed in a different end portion of said upper wall of said energy absorbing member to confront said fitting leg, said fitting hole including an insertion portion opened to allow said flange portion of said fitting leg to be inserted therein and a fitting opening portion contiguous to said insertion portion, said fitting opening portion having a diameter smaller than that of said flange portion and into which said shaft portion can be inserted; and
- a substantially cylindrical spacer which has a flange portion at the front portion thereof and which can be screw-fixed to the reverse side of said pad to correspond to said fastening hole, whereby in a state where said flange portion of said fitting leg is fitted to the peripheral portion of said fitting opening portion by sliding said fitting leg into said fitting opening portion after said fitting leg has been inserted into said insertion portion, said spacer is inserted into said fastening hole so as to bring said flange portion of said spacer into contact with the peripheral portion of said fastening hole before said spacer is screw-fixed to the reverse side of said pad so that said pad is fastened to said energy absorbing member.

14. A steering wheel according to claim 13, wherein said pair of side walls have substantially the same length in said axial direction of said steering wheel shaft.

15. A steering wheel according to claim 13, wherein said projecting portion is a rib having, at the distal end thereof, a surface parallel to the end portion of said upper wall of said energy absorbing member.

16. A steering wheel according to claim 13, wherein said base portion includes a plurality of fitting holes and said boss portion includes fitting projections to be fitted into said fitting holes.

17. A steering wheel according to claim 13, wherein said boss portion includes a plurality of fitting holes and said base portion includes fitting projections to be fitted into said fitting holes.

* * * * *